United States Patent [19]

Linkous

[11] 3,987,324
[45] Oct. 19, 1976

[54] HIGH EFFICIENCY INDUCTION MOTOR WITH MULTI-CAGE ROTOR

[75] Inventor: Clovis E. Linkous, Fort Wayne, Ind.

[73] Assignee: General Electric Company, Fort Wayne, Ind.

[22] Filed: May 20, 1974

[21] Appl. No.: 471,743

[52] U.S. Cl. .............................. 310/197; 310/172; 310/211
[51] Int. Cl.² ........................................ H02K 17/16
[58] Field of Search ............. 310/124, 172, 125, 72, 310/166, 261, 211, 264, 254, 212, 265, 262, 182, 183, 267, 197, 102, 268, 198, 200–209, 224, 167; 318/221 D, 224; 249/65; 164/99, 109; 336/73, 75, 77, 79

[56] References Cited
UNITED STATES PATENTS

| | | | |
|---|---|---|---|
| 686,152 | 11/1901 | Smith | 310/211 |
| 1,185,461 | 5/1916 | Alexanderson | 310/224 |
| 1,603,545 | 10/1926 | Johnson | 249/65 |
| 1,650,795 | 11/1927 | Johnson | 164/99 |
| 1,752,104 | 3/1930 | Myers | 310/212 |
| 2,037,532 | 4/1936 | Morrill | 310/212 |
| 2,176,871 | 10/1939 | Harrell | 310/211 |
| 2,237,960 | 4/1941 | Hansen | 310/172 |
| 2,274,070 | 2/1942 | Kauders | 310/212 |
| 2,292,168 | 8/1942 | Smith | 310/212 |
| 2,864,016 | 12/1958 | Waltscheff | 310/102 |
| 3,335,308 | 8/1967 | Robinson | 310/211 |
| 3,360,669 | 12/1967 | Sagalow | 310/211 |
| 3,445,699 | 5/1969 | Beaudry | 310/125 |
| 3,555,382 | 1/1971 | Miyasaka | 318/221 D |
| 3,594,595 | 7/1971 | Williams | 310/182 |

Primary Examiner—R. Skudy
Attorney, Agent, or Firm—Ralph E. Krisher, Jr.

[57] ABSTRACT

Fractional horsepower induction motors having a fixed number of poles (and, accordingly, a single no load synchronous speed) that are particularly adapted for multi-speed operation when driving a fan load by changing the field strength of the main winding. Induction motors of N fundamental poles have squirrel cage rotor having a plurality of interrelated conductor bars and end rings that are arranged so that multiple sets of the rotor bars establish a predetermined number of separately identifiable cage sets such that the fundamental pole structure of the stator field is coupled with the rotor and such that the third harmonic of the stator field is not coupled with the rotor. The rotor slot number and total number of separately identifiable cage sets are selected so that a cage set pattern is provided that has two-thirds of a fundamental pole pitch. In addition, the number of rotor cage end rings at one end times the number of rotor cage end rings at the other end is greater than or equal to the number of different cage types.

14 Claims, 20 Drawing Figures

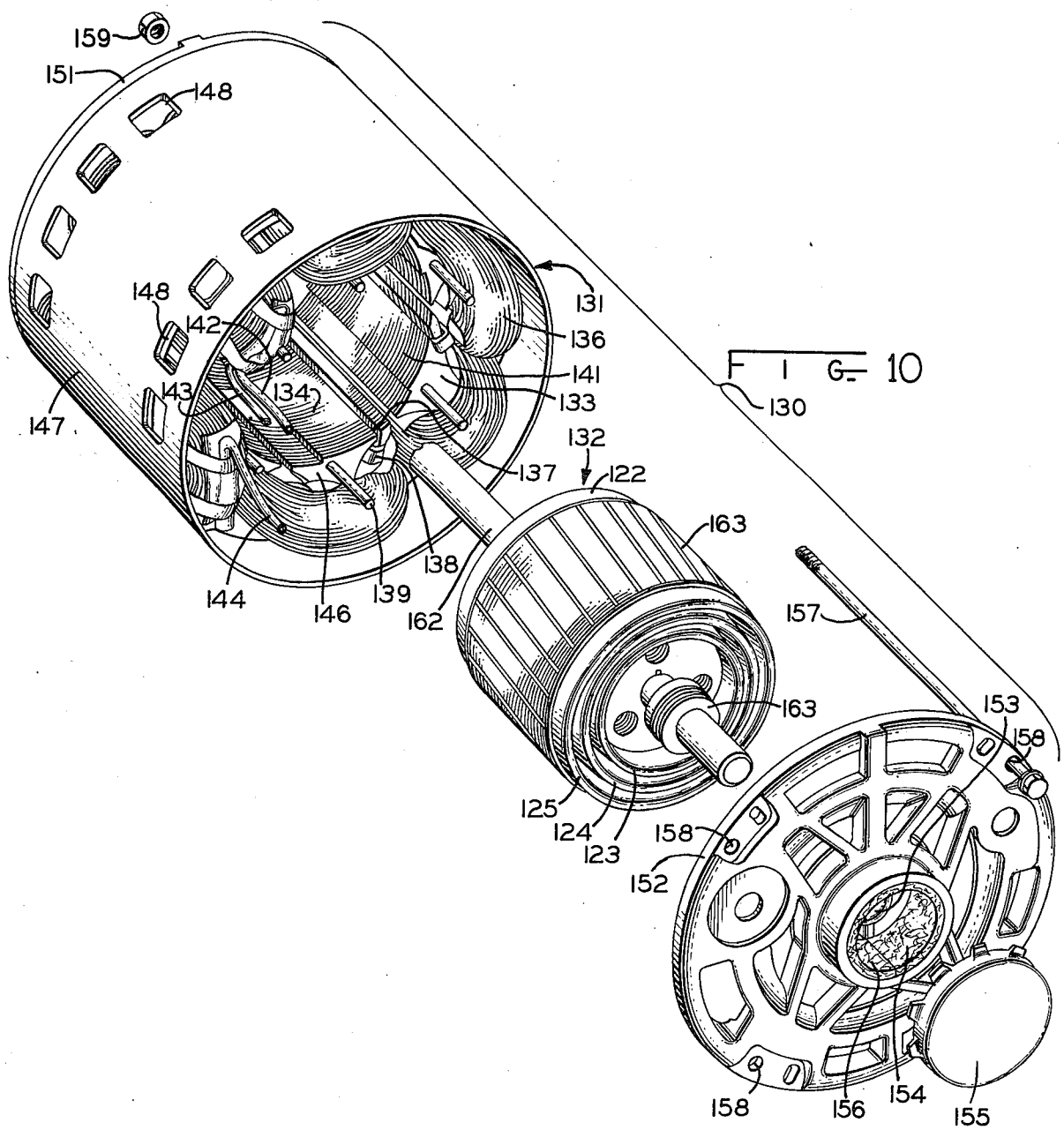

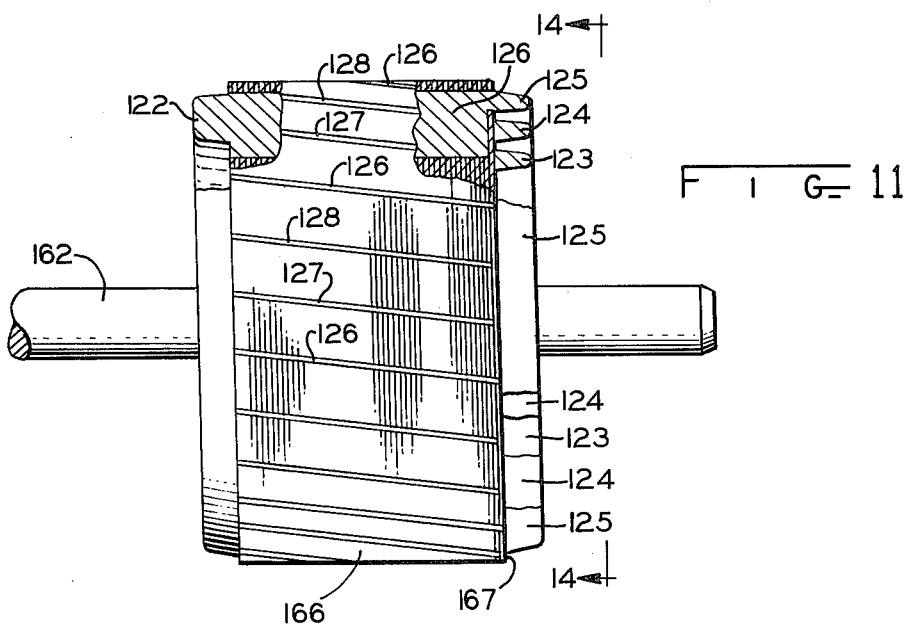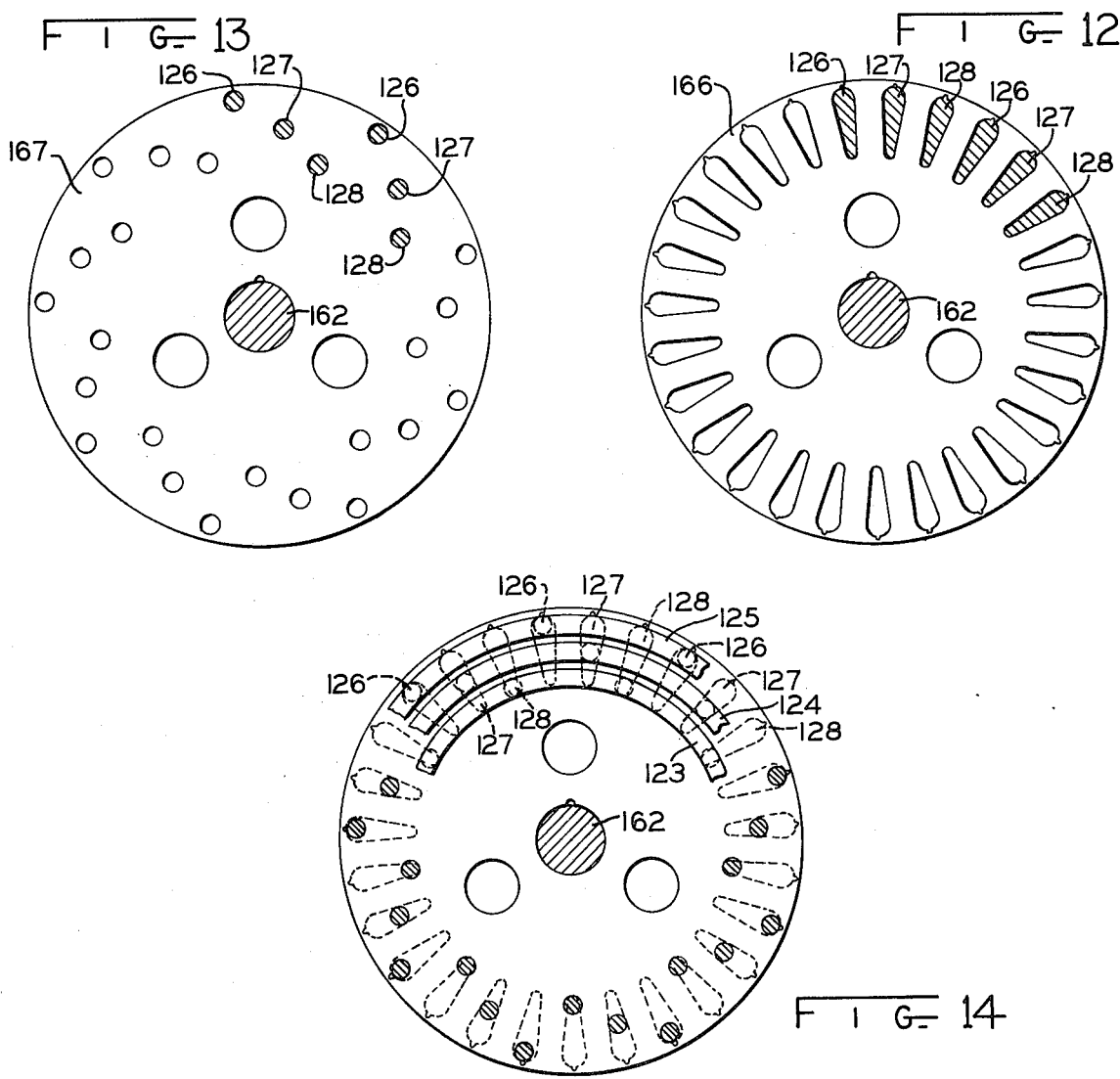

HIGH EFFICIENCY INDUCTION MOTOR WITH MULTI-CAGE ROTOR

BACKGROUND OF THE INVENTION

The present invention relates to dynamoelectric machines and, more particularly, to induction motors having a fixed polar configuration (i.e., a fixed number of main or running poles and therefore only one no-load synchronous speed) that are particularly adapted for operation in conjunction with a driven device such as a fan, and wherein different operational speeds for a given driven device load are obtained by selectively changing the field strength (e.g., by changing the number of effective ampere turns, or by changing the impressed voltage) without changing the number of poles.

A very large number of single phase motors are sold each year in the horsepower range of about 1/20 to ¾ horsepower for air moving fan applications, in many of which the fan is driven directly by the motor. As a consequence of such direct drive, and the speed-torque characteristics of a fan, these applications normally require relatively little starting torque. For this reason, shaded pole induction motors and permanent split capacitor induction motors (which have low starting torque) have found wide usage. This relatively wide usage has resulted because of the relative simplicity in design and fabrication of such motors. This simplicity (at least in part) is due to the fact that these types of motors do not require removal of a start winding from the operating motor circuit at operating speeds.

Conventional shaded pole motors generally are handicapped by cooling limitations that result from the low efficiencies associated with such motors. On the other hand, permanent split capacitor motors tend to be handicapped by the expense associated with start windings that usually have many turns of small wire and a continuous duty capacitor.

The relatively low efficiency of shaded pole motors is due to, among other things, relatively high losses in the rotor and shading coils, these losses being manifest of course in the form of heat. When more heat is generated by a motor, it becomes more difficult to provide adequate motor cooling. If the rotor and/or shading coil losses of a shaded pole motor could be reduced, it should be possible to make other advantageous cost reducing changes while still serving the market place with equal effectiveness.

Since the direct drive fan market is primarily interested in motor temperature rise; in those cases where the temperature rise of a presently existing motor is acceptable, a decrease in rotor loss would allow greater loss in the main winding and associated stator core losses. This would mean that current densities could be raised in the main winding with consequent material reductions and cost savings--both for shaded pole and permanent capacitor motors.

In those cases where shaded pole motors are not now being used because the temperature rise of presently available motors are too high, a newly designed shaded pole motor with a decrease in rotor losses (without an increase in main coil and core losses) could allow such a shaded pole motor to be applied. The less expensive shaded pole motors then could replace the more expensive permanent capacitor motor type in many cases.

It thus will be understood that innovation which would provide such advantageous alternatives would be very desirable. It would of course be of value to reduce the rotor losses in all types of motors having relatively high space harmonic content in the stator magnetic field; e.g., in motors having only a few (e.g., one or two) concentric coils per coil group (or pole). This is usually the case, for example, in relatively small permanent capacitor motors (e.g., about six inches or less diameter) having a relatively large number of poles (e.g., four or six or more) and in shaded pole motors.

For direct fan or blower drive applications, shaded pole or permanent capacitor motors are normally designed to have a fixed number of poles. The pole number is selected so that the synchronous speed of the motor under no load conditions will be somewhat greater than the highest desired operating speed of the fan that is to be driven by the motor. For example, if the highest desired fan speed is in the neighborhood of 1000 rpm, a six pole motor would probably be selected provided a 60 HZ voltage source was to be used (it being understood that the synchronous speed of a six pole induction motor energized by a 60 HZ source or 50 HZ source is about 1200 rpm or 1000 rmp, respectively).

Whether of the shaded pole or permanent capacitor type, motors selected for multi-fan speed operation are usually designed to have taps coming from the main windings. Different speeds then occur (under load) when the slip is varied by varying the field strength. The field strength is varied of course by the selective energization of different taps or winding leads. The highest desired speed will occur when the fewest number of turns are placed across the line voltage. On the other hand, when all of the turns are energized by line voltage, the field strength, and thus speed under a given load will be a minimum. It is again emphasized that multi-speed operation of the shaded pole and permanent capacitor motors discussed herein is obtained by changing the field strength (by changing the number of effective winding turns or by changing the applied voltage), rather than by changing the number of poles that are energized. These types of motors have long been recognized as having an unstable low-speed connection. "Unstable low-speed" is described in more detail hereinbelow, but it is now noted that the low speed of such motors is relatively sensitive to changes in applied voltage, fan or blower inlet and outlet restrictions, and so forth.

The voltage supplied to a residence may be greater or less than nominal (thus causing objectionable low-speed motor instability) as a result of power transmission line voltage drops, peak loading of a gnerating station, or what is currently known as "brown-outs".

For these and other reasons, original equipment manufacturers who purchase variable-field strength multi-speed motors (hereinafter referred to simply as "multi-speed" motors) for direct drive fan or blower applications are usually interested in the speed torque relationships of such motors not only at the nominal voltage but also at voltages that vary from the nominal voltage (for example, plus or minus 10 percent).

Heretofore, it has been necessary for motor manufacturers and purchasers of multi-speed motors to compromise between a motor design having relatively high efficiency at high speed but poor low-speed stability, or a motor designed to have good low-speed stability but poor high speed efficiency. The compromise solution has usually involved the selection of a motor design having relatively poor low-speed stability and less than maximum efficiency.

It thus should be understood that it would be particularly desirable to provide new and improved induction motors having improved efficiencies; and, depending on the intended application of the motor, it would be particularly advantageous if such motors would have improved low-speed stability when designed for multi-speed applications.

SUMMARY OF THE INVENTION

Accordingly, it is an object of the present invention to provide improved inducton motors having improved efficiencies.

Another object of the prpesent invention is to provide improved induction motors particularly adapted to have improved low-speed stability in multi-speed applications.

Still another object of the present invention is to provide: motors wherein the stator magnetic field has a relatively high space harmonic content and yet wherein the rotor losses are comparatively reduced in magnitude.

In carrying out the above and other objects of the present invention, in one form thereof, I provide fractional horsepower induction motors having a fixed number of poles (and, accordingly, a single no load synchronous speed) that are particularly adapted for multi-speed operation when driving a fan load by changing the field strength of the main winding. In preferred embodiments of the invention, I provide a squirrel cage rotor having a plurality of interrelated conductor bars and end rings that are arranged so that multiple sets of the rotor bars establish an odd number of separately identifiable cage sets such that the fundamental pole structure of the stator field is coupled with the rotor and such that the third harmonic of the stator field is nott coupled with the rotor. The rotor slot number and total number of separately identifiable cage sets are selected so that a cage set pattern is provided wherein adjacent bars of each given cage set are spaced apart two-thirds of a fundamental pole pitch. In addition, the number of rotor cage end rings at one end times the number of rotor cage end rings at the other end is greater than or equal to the number of different cage or sets.

The subject matter which I regard as my invention is particularly pointed out and distinctly claimed in the concluding portion of this specification. My invention, itself, however, both as to its organization and mode of operation, together with further objects and advantages thereof, may best be understood by reference to the following description taken in connection with the accompanying drawings.

BRIEF DESCRIPTION OF THE DRAWINGS

FIG. 10 is an exploded perspective view of a motor embodying the present invention and in which a rotor is utilized having a number of sets of cages substantially as depicted in FIG. 9;

FIG. 11 is a side elevation, with parts removed and parts broken away of the rotor shown in FIG. 10;

FIG. 12 is a view of rotor laminations used in the fabrication of the rotor shown in FIG. 11;

FIG. 13 is a view of an end lamination used in the fabrication of the rotor shown in FIG. 11;

FIG. 14 is a somewhat schematic view, with parts broken away, (and parts removed) of part of the rotor shown in FIG. 11;

FIG. 16 is a schematic representation of the rotor cage pattern of the rotor of FIG. 15;

DESCRIPTION OF THE PREFERRED EMBODIMENTS

Figure 1:
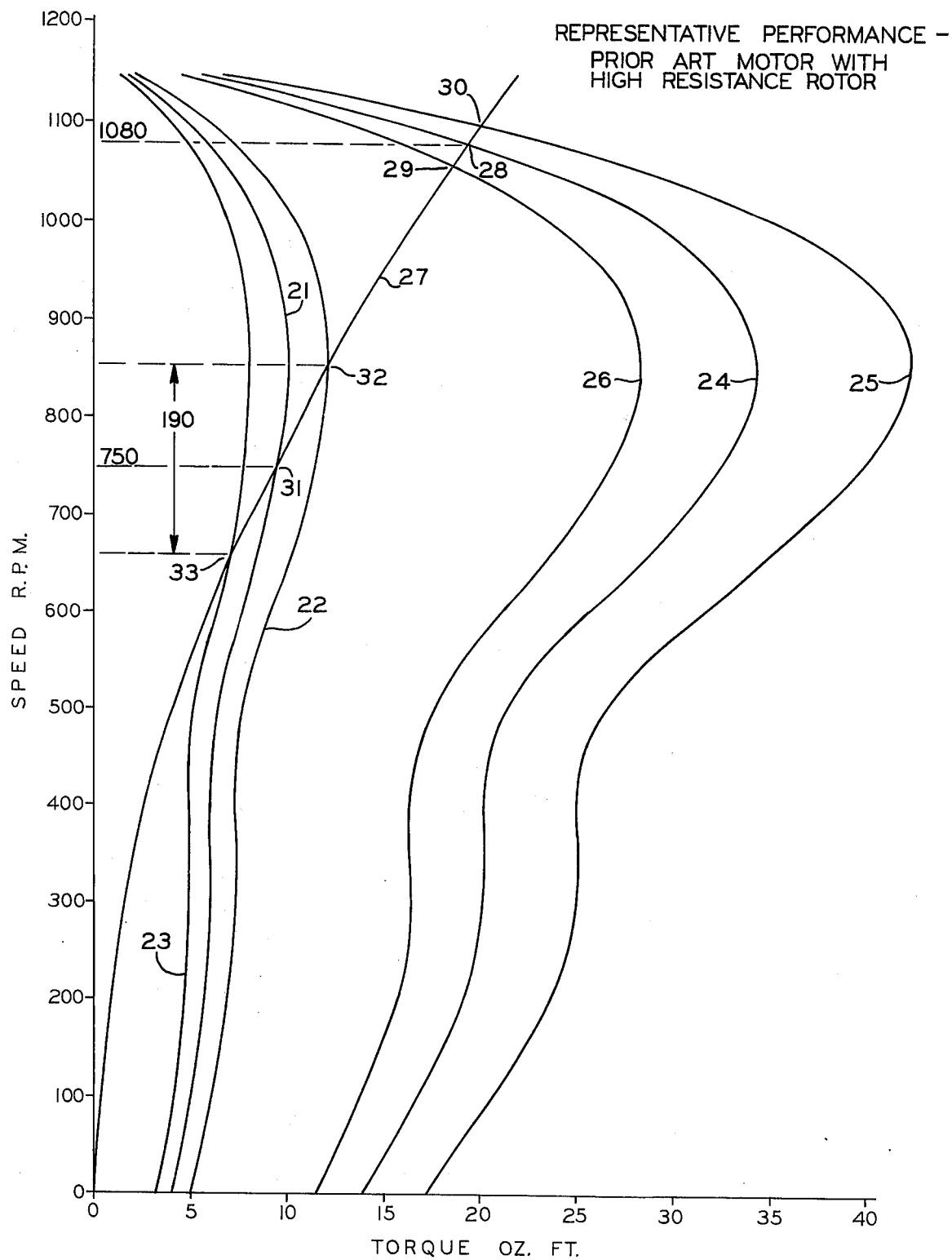
FIG. 1 is a graph of representative speed torque curves of one type of motor known in the prior art with a given fan load curve superimposed on the motor speed torque curves.
Figure 2:
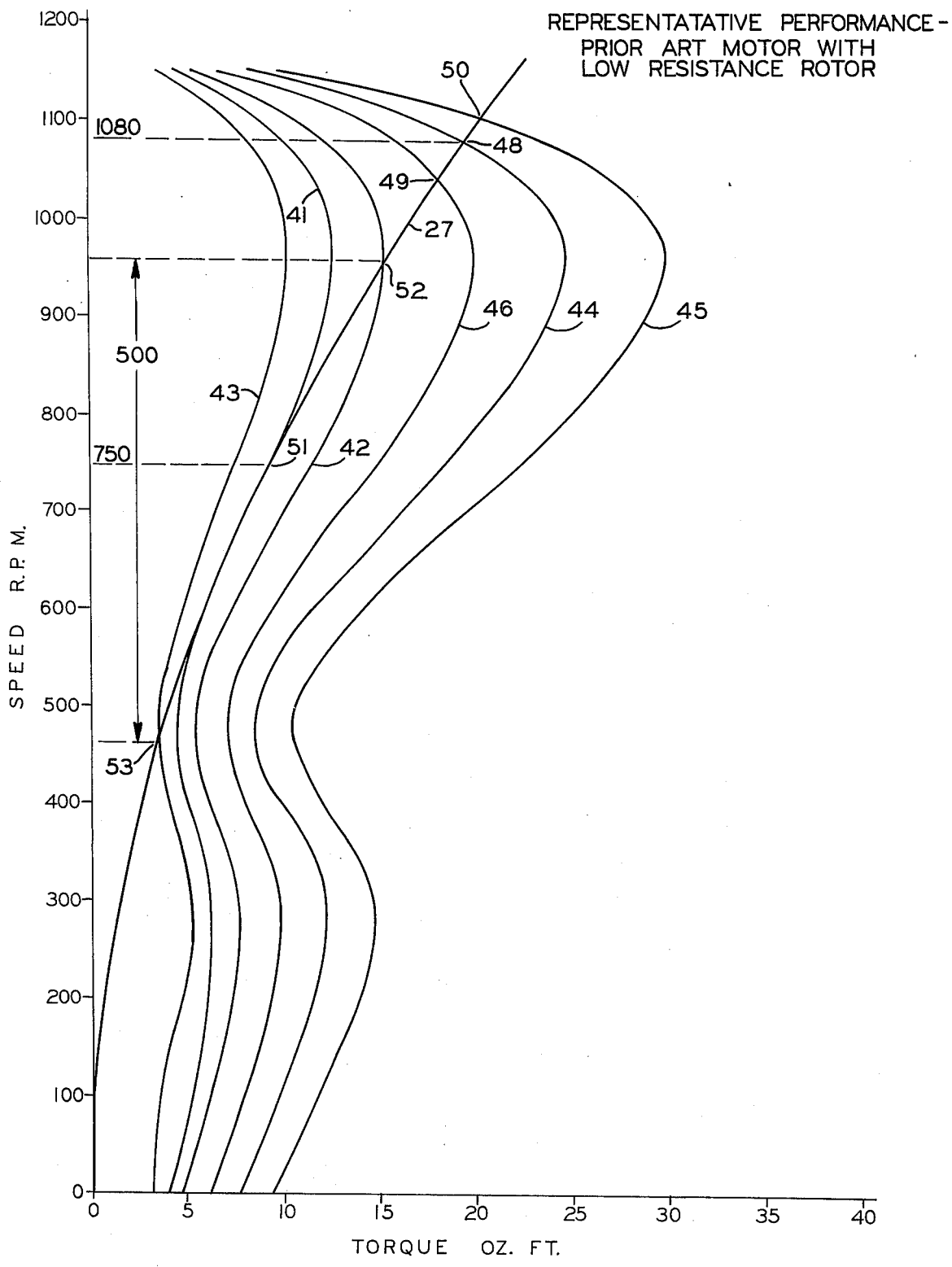
FIG. 2 is similar to FIG. 1 with the exception that the speed torque curves of the motor are those that correspond to a second prior art motor type.
Figure 3:
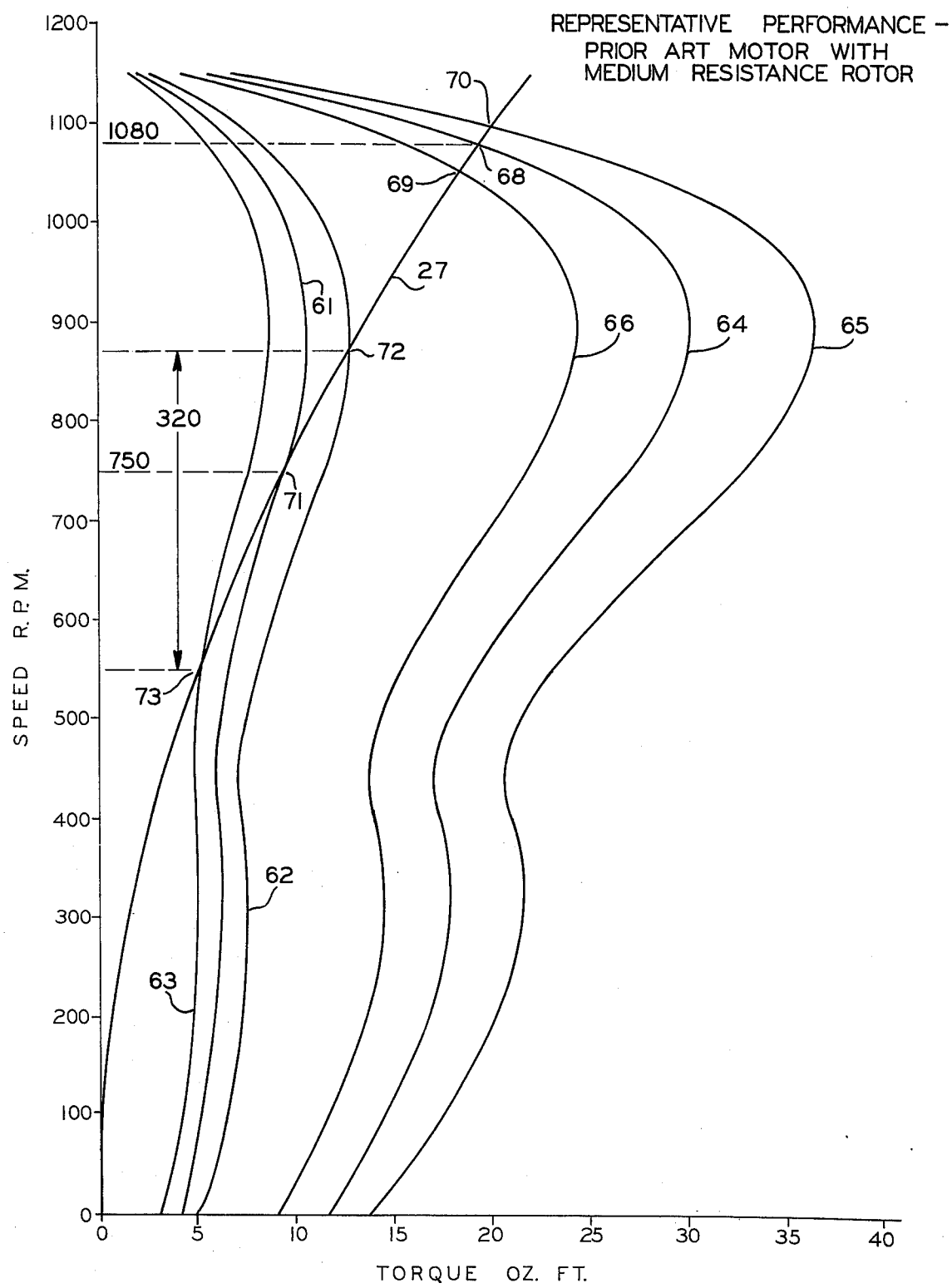
FIG. 3 is similar to FIGS. 1 and 2 with the exception that the motor speed torque curves are those that would be associated with still a third prior art motor type.

With initial reference to FIGS. 1–3 of the drawings collectively, it is first pointed out that these Figures are presented for the purpose of insuring a rudimentary understanding of the characteristics of, and application requirements pertaining to, prior art motors. The speed torque curves of FIGS. 1–3 are curves that have been obtained from tests of actual motors that are prior art as to the present application. It is believed that the curves of FIGS. 1–3 are generally representative of the speed torque curves of motors available heretofore from the fractional horsepower motor industry. The only difference between the motors utilized for obtaining the curves shown in FIGS. 1–3, is that a high resistance rotor was used to obtain the data of FIG. 1; a low resistance rotor was used to obtain the data for FIG. 2; and a medium resistance rotor was utilized to obtain the data for FIG. 3. The stators utilized in obtaining the data of FIGS. 1–4 comprised substantially identical stator cores (same stack height and lamination geometry) as produced in the regular commercial production of the assignee of this application, although each were wound differently to provide the desired operating points. It also is noted that a typical speed torque load curve 27 of a direct driven fan has been superimposed on each of FIGS. 1-4.

With reference now to FIG. 1, the curve 21 resulted when all of the main winding turns are energized from a nominal voltage source. The curve 22 resulted when 110 percent of nominal voltage (high voltage) was impressed on all of the main winding turns. The curve 23 on the other hand represents the speed torque characteristics of the motor (connected for low speed operation with all of the main winding turns energized) under low voltage conditions, low voltage being defined as 90 percent of nominal voltage.

The curve 24 represents the high speed motor operation which occurred when only a portion of the main winding turns were energized (i.e., connected in series with the line voltage) at the same nominal voltage that was applied to obtain curve 21. The curves 26, 25 represent the operating characteristics of the same motor connected for high speed operation when the voltage applied thereto was 90 percent and 110 percent of nominal, respectively. The fan load curve 27 (this same curve being denoted by the same reference numerals in FIGS. 1-4) was drawn to represent the speed torque relationship of a typical direct driven fan or blower.

With continued reference to FIG. 1, it will be assumed that a user of a first motor represented by FIG. 1 has specified that the fan is to operate in an appliance (such as a room air conditioner) at two different selectable speeds. It further is assumed that the high speed operating point for the fan (under nominal voltage conditions) is to be 1080 rpm whereas the desired low speed operating point (under nominal voltage conditions) is to be 750 rpm. It should be noted that the curves 21 and 24 show that the first motor meet these criteria. However, the efficiency for this first motor was only 28.3 percent at the high speed operating point 28, although the low-speed stability of this first motor was relatively good. This good stability is shown by the fact that the fan speed would vary only 190 rpm when the applied voltage varied between ninety and one hundred and ten percent of nominal. This speed variation is of course the difference between the speeds corresponding to the points 32 and 33 where the fan curve 27 intersects the motor curves 22, 23 respectively. The points 29, 30 of course represent the high speed operating points at low and high voltage conditions, respectively; while the driven fan will be operated at a desired low speed of 750 rpm at nominal voltage as indicated by point 31.

Again referring to the speed difference between points 32 and 33; this difference is an indication of what is referred to in the art as the "stability" of a motor under low speed operating conditions. Thus, a motor for a given application will be less stable if this speed range is relatively great, while another motor for the same application would be considered to be more "stable" if this speed range is relatively small.

It should be noted at this point that for many applications (again remembering that room air conditioners are one example) a low speed fan setting is often desirable. This setting would be used when a minimum amount of noise associated with air flow is desired. For example, a consumer might prefer to hve a room air conditioner operate in its most quiet mode during sleeping hours or when maximum cooling effect is not required.

The considerations of relative noise levels and relative cooling effect are two of the considerations that affect the specification that a given fan have a particular operating point such as the one indicated by the point 31 in FIG. 1. It will be understood that any variation in speed from the point 31 represents a departure from a desired norm. For example, if the operating point of the driven fan coincides with point 32, more cooling effect results but this would be accompanied with relatively increased noise levels. On the other hand, operation of the fan at a speed corresponding to point 33 would provide a more quiet mode of operation but the cooling effect at that speed would be diminished because of a diminished volume of air flow. Moreover, if the speed at point 33 is too low, insufficient cooling of the motor might result, with the unfortunate ultimate result of overheating and possible permanent damage to the motor. It should again be noted that the high speed efficiency for the first motor discussed hereinabove was only about 28.3 percent.

Turning now to FIG. 2, the explanation and description of the curves 41-46 would correspond to the above description of the curves 21-26. The description of points 48-53 would parallel the discussion and description, respectively, of points 28-33 in FIG. 1. It is, however, again emphasized that the curves 41-46 were obtained by using a rotor having a relatively low resistance as compared to the rotor used to obtain the curves 21-26. While this "second" motor (i.e., the motor from which the data of FIG. 2 was obtained) had a high speed efficiency of 37.6 percent at operating point 48; this motor had poor low-speed stability.

More specifically, when connected for low speed operation, the second prior art motor would have a speed variation of 500 rpm, depending on the voltage applied thereto.

A compromise between the low-stability-high-efficiency "second" motor, and the high-stability-low-efficiency "first" motor would be a "third" prior art motor having the same stator core as the "first" and "second" motors, but a medium resistance rotor. FIG. 3 represents the speed-torque relationships of such a "third" motor. This motor was, of course, wound to provide the specified torque (at nominal voltage) at 750 and 1080 rpm.

A description of the curves 61-66 would parallel the foregoing description of curves 21-26; and a discussion of points 68-73 would parallel the discussion of points 28-33 in FIG. 1. However, the efficiency of the third motor at the high speed operating point 70 was 33 percent whereas the speed range between the points 72 and 73 was 320 rpm. It will be appreciated that the high speed efficiency of 33 percent is less than the efficiency of the "second" prior art motor referred to in connection with FIG. 2. Moreover, the stability of the "third" motor is not as good as the stability of the "first" motor. However, the "third" motor represents the performance characteristics of motors that have, as a matter of necessity, been used heretofore.

Figure 4:
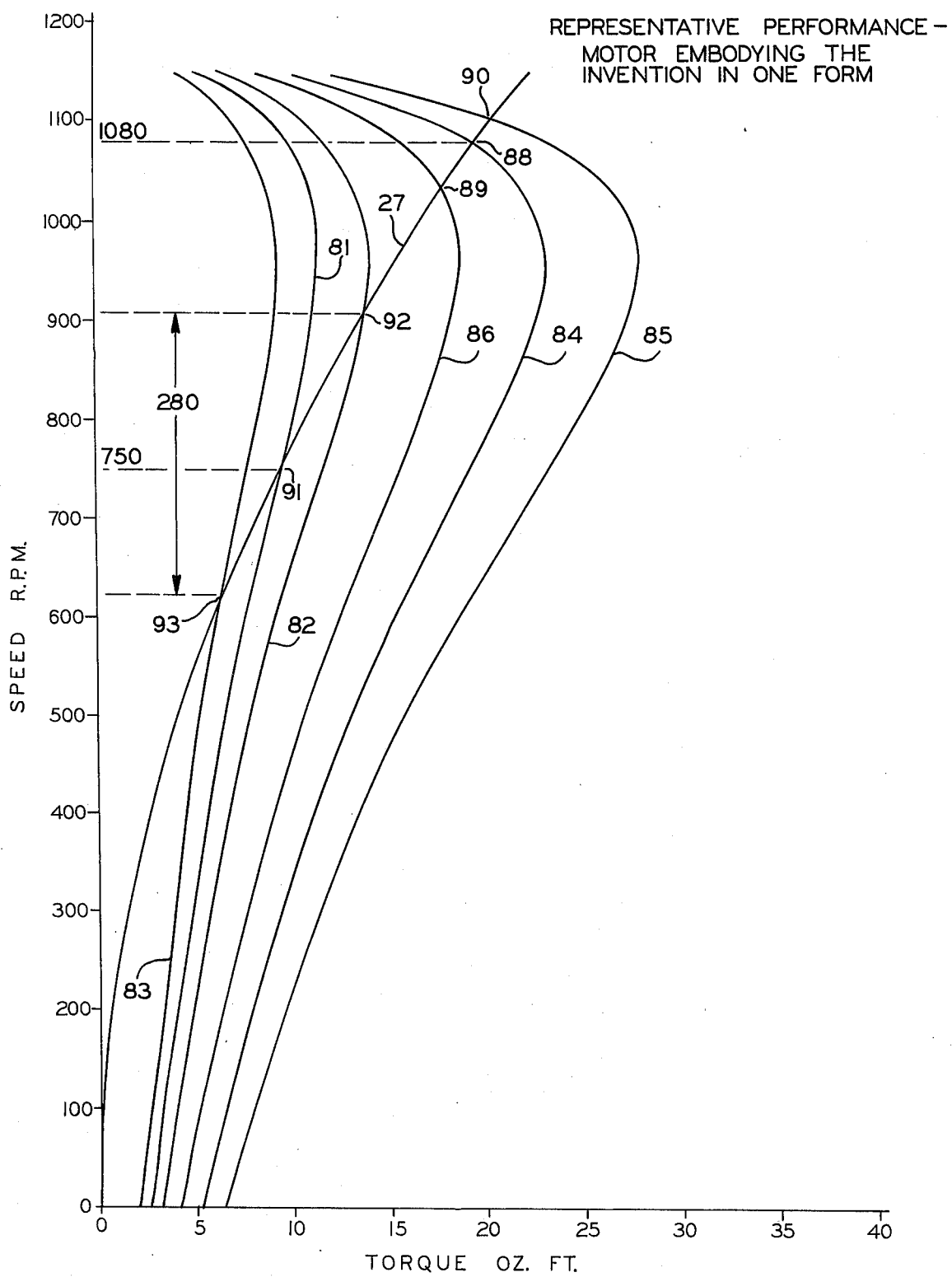
FIG. 4 is a graph of speed torque curves of a motor embodying the present invention in one preferred form, with the same fan load curve superimposed thereon that is superimposed on the curves in FIGS. 1, 2, and 3.

FIG. 4 is a plot of data taken from a motor embodying the present invention in one form. A description and discussion of curves 81-86, respectively, would parallel the discussion and description of the curves 21-26 in FIG. 1. Moreover, a discussion of points 88–93 would parallel the discussion, respectively, of the points 28–33 in FIG. 1.

Three items in particular should be noted when considering FIG. 3. First it is noted that the speed range between the points 92 and 93 is only about 280 revolutions per minute which is an improvement as compared to the 320 rpm range that was discussed in conjunction with FIG. 3. Thus, FIG. 4 represents a more stable motor as compared to the previous "compromise" solution. Secondly, and even more significantly, the efficiency of the motor embodying the present invention (at operating point 88) was 39.4 percent. This is significantly better than the efficiency of any of the motors discussed in conjunction with FIGS. 1–3. It also should be noted that the speed torque curves 81–86 do not show an appreciable or significant dip in the vicinity of 450 rpm, even though such a dip did occur in all of the curves shown in FIGS. 1–3.

The reason for the absence of such a dip in the speed torque curve (at about ⅓ synchronous speed) for the motor embodying the present invention is that there was substantially no coupling between the third space harmonic and the rotor.

Taking shaded pole motors as one example, for purposes of discussion, the main winding of shaded pole motors produces a square wave of magnetomotive force such that the odd space harmonics have amplitudes that are ⅓, 1/5, 1/7, etc., respectively of the fundamental. In normal applications, these motors have a running speed which is two to three times the synchronous speed of the third space harmonic. Known squirrel cage rotors usually have five to six slots per pole. Such a rotor winding (with no spiral) has good magnetic coupling to the third, fifth and seventh space harmonics. Thus the third and higher harmonics act as an electromagnetic brake on the motor at running speed. The braking effect of the third harmonic will cause dips at approximately one third synchronous speed as clearly revealed, for example, in FIGS. 1–3.

The losses associated with the third and higher harmonics occur as ohmic losses in the rotor. It thus will be understood that conventional motors inherently have relatively high rotor losses. To give an indication of the magnitude of such losses, I have determined that, with some motors having an output power of 63 watts, the rotor losses alone amount to 52 watts. In those particular motors, the rotor loss alone is more than 82 percent of the useful output power.

One prior technique that has been directed to solving the problem of rotor coupling with space harmonics has involved spiraling the rotor slots with respect to the stator slots by a fundamental electrical angle in the range of 40 electrical degrees to 80 electrical degrees. This would be 120 to 240 electrical degrees for the third harmonic, 200–400° for the fifth harmonic, and so forth. The amount of spiral should be enough that the third harmonic braking torque will not exceed the net forward torque of the fundamental fields. However, extreme rotor slot spiral causes, among other things, poor flux density distribution, pulsating axial forces on the rotor, and partial decoupling of the fundamental field. Thus, extreme rotor slot spiral is not an effective solution to the problem.

Figure 20:
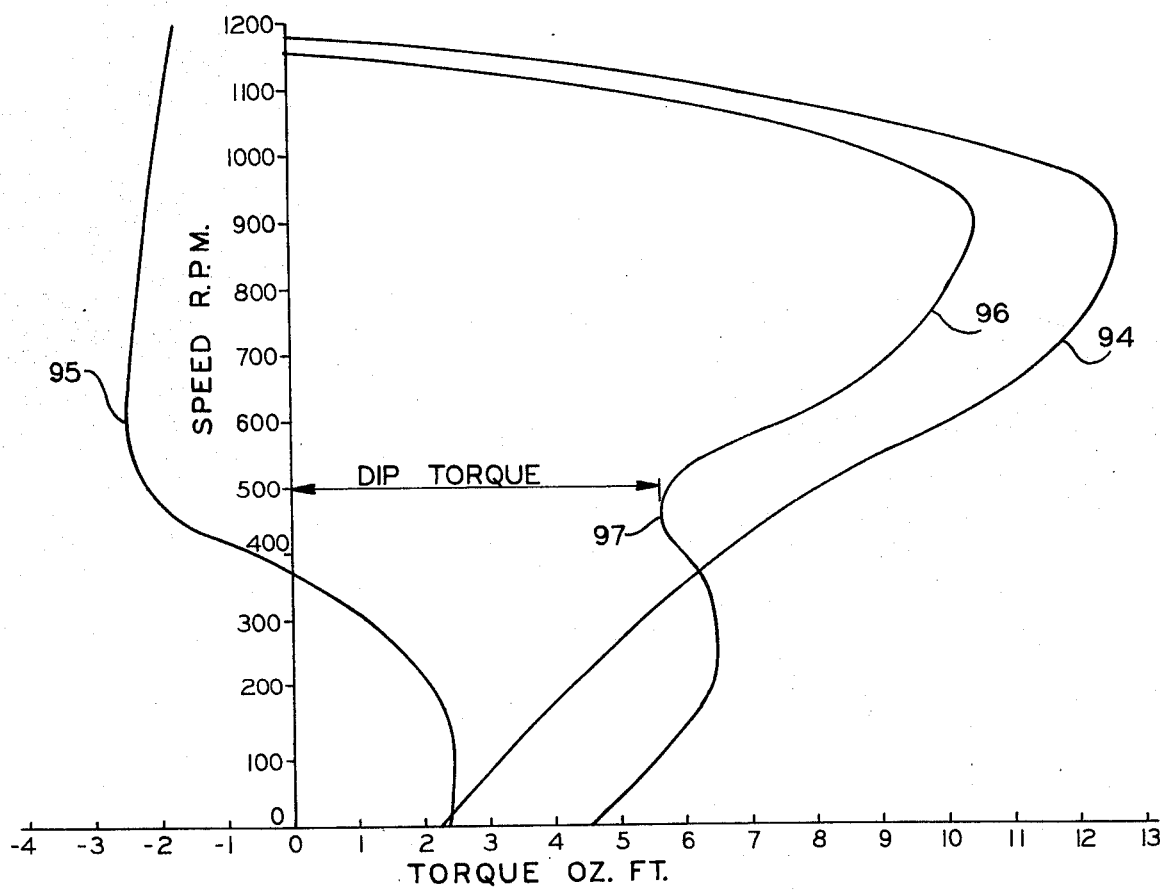
FIG. 20 is a graph of curves showing speed torque relationships of a motor, the curves being selected to explain the relationship of torques associated with a fundamental and a third harmonic space mmf.

The magnitude of this problem, with respect only to the third harmonic, is clearly depicted by the curves shown in FIG. 20. In FIG. 20, the curve 94 generally depicts the torque attributable at different speeds to the fundamental field in a shaded pole motor. The curve 95 on the other hand, generally represents the torque attributable to the third harmonic. The curve 96 generally represents the net useful torque when the effects of both the fundamental and third harmonic are considered. The cusp in the vicinity of point 97 should be noted, this cusp identifying what is known as "dip torque" in the art.

Figure 5:
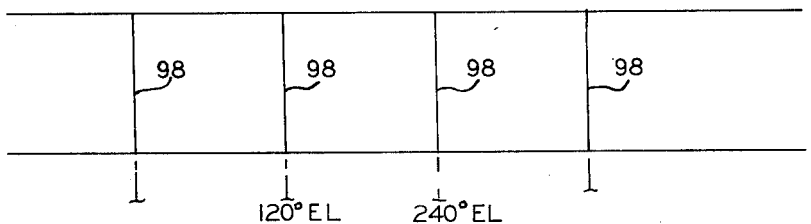
FIG. 5 is a schematic representation of a rotor cage that is useful in setting the background of an initial understanding of the present inventive disclosure.

Turning now to FIG. 5 for an initial discussion of rotor cages, FIG. 5 schematically shows the circuit of a squirrel cage rotor where the pitch between adjacent conductor bars 98 is 120 fundamental electrical degrees. This means that the slot pitch would be 360 electrical degrees for the third harmonic, so there would be no coupling with the third harmonic. In terms of equivalent circuit perameters, this means that the rotor leakage reactance to the third space harmonic would be infinite. The slot pitch for the fifth and seventh space harmonics would be 600° and 840°, respectively, which means very high rotor leakage reactance for those harmonics also. Insofar as coupling with space harmonics are concerned, a cage as shown in FIG. 1A would solve the problem. However, the rotor leakage reactance to the fundamental would also be high and could seriously limit the motor output. Furthermore, geometrical and cage conductivity limitations would result in a rotor resistance to the fundamental that would not be optimum.

Figure 15:
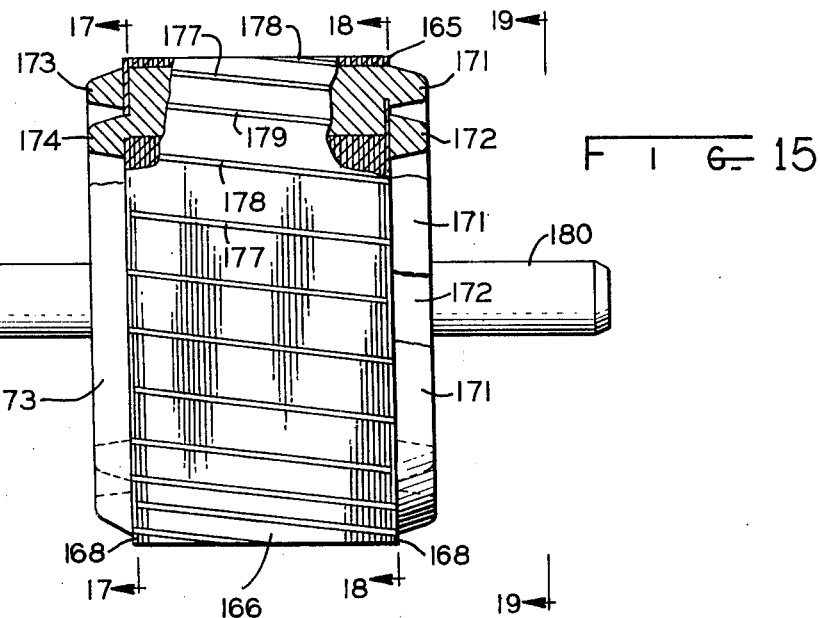
FIG. 15 is a view of a rotor constructed to have a rotor cage pattern as schematically depicted in FIG. 16, and which is usable in lieu of the rotor shown in FIG. 11 as part of the motor of FIG. 10.

I have now devised a way in which the benefits of third space harmonic decoupling is obtainable without limiting or undesirably affecting the coupling with the fundamental space harmonic. The motor of FIG. 10 represents a motor construction that utilizes my invention, while FIGS. 11–19 illustrate representative alternative modes of carrying out the invention. It will be noted that the rotors of FIGS. 11 and 15 are provided with multiple end rings. More importantly, and as will be understood from the description presented hereinafter, the conductor bars of the squirrel cage rotor and the multiple end rings are interconnected in very specific manners so as to provide decoupling (i.e., prevent coupling) with a third space harmonic and yet so as to maintain good coupling with the fundamental field. For a better understanding of how ths is done, reference is now made to FIGS. 6–9.

Figure 6:
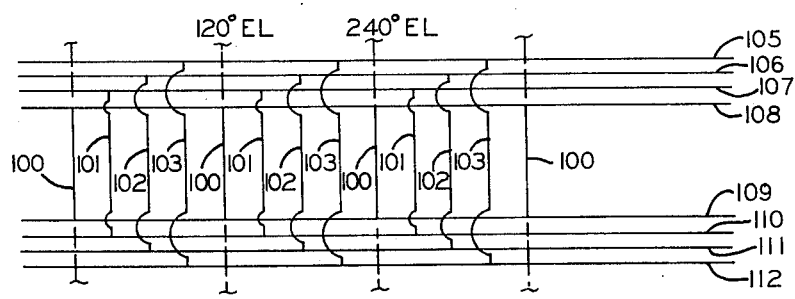
FIG. 6 is a schematic representation of rotor cages that are useful for the same purpose as FIG. 5.

FIG. 6 shows four different independent cage sets, with each set similar to the cage of FIG. 5 in that the bars which are connected to a same pair of end rings are spaced apart 120 fundamental electrical degrees. However, there is a spacing of only 30 fundamental electrical degrees between adjacent bars or rotor slots. In FIG. 6, a first cage set is made up of the conductor bars 100, a second cage set is comprised of the conductor bars 101, and the third and fourth cage sets are made up, respectively, of the conductor bars 102 and 103. It will be noted that the bars 100–103 are connected in a particular pattern to the conductors 105–112 (which represent rotor end rings), and that this pattern determines the identity of the cage sets. Mutual coupling between the four cage sets of FIG. 6 would exist for the fundamental, and they would act as one cage with six slots per fundamental pole and would have resistances and reactances for the fundamental which would be optimum. However, the four cages, collectively, would still have very poor coupling to the space harmonic fields. In motor sizes of seven inches outer diameter and less, a rotor with four electrically separated cages would be relatively difficult to build with existing high volume construction techniques even though desirable, because of the necessity of providing four relatively fragile electrically independent conductor rings at each end of the rotor.

Figure 7:
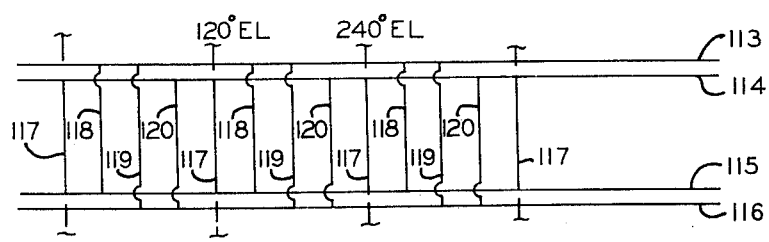
FIG. 7 is still another schematic representation of rotor cages that are useful like FIGS. 5 and 6.

For this reason, it would be more desirable to provide a rotor that would be schematically depicted as shown in FIG. 7. The circuit of FIG. 7 is very similar to the circuit of FIG. 6 (showing a cage pattern for two fundamental frequency poles) and would be more practical to construct, in smaller physical sizes, on a high volume basis; it being noted that a rotor corresponding to the rotor of FIG. 7 would have only two end rings on each end. In FIG. 7 the end rings would be represented by the conductors 113–116 respectively. The four cage sets, on the other hand, are made up, respectively, of the conductors 117, 118, 119, and 120.

By tracing through the various possible closed loops in FIG. 7, the conclusion is reached that there would be no closed loop for a pole span of 60 electrical degrees and thus there would be no coupling for the third harmonic for rotors that were constructed to have a circuit as illustrated in FIG. 7. There are, however, four different and spaced apart closed loops in this circuit of 120 fundamental electrical degrees. Thus, the fundamental coupling remains.

While rotor circuits as shown in FIGS. 6 and 7 would solve the third harmonic coupling problem, motors built to embody such circuits indicate that yet another problem results. Such motors would exhibit extreme amounts of reluctance locking torque.

I have now determined that this problem of reluctance locking torque may be overcome if the number, "$n$" of different cage sets is an odd number. Decoupling of the third space harmonic may still be accomplished provided that the span (in fundamental electrical degrees) between two adjacent bars in the same cage set is, preferably, ⅔ of a fundamental pole pitch. Moreover, the number of end rings "A" at one rotor end times the number of end rings "B" at the other rotor end must be equal to or greater than the number "$n$". Of course, end conductors of other than "ring" shape may be used if desired.

Figure 9:
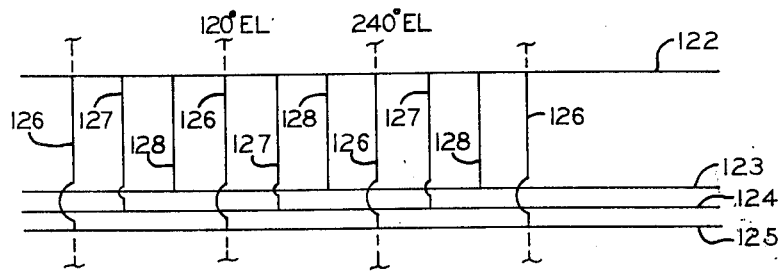
FIG. 9 is a schematic representation of rotor cages within a squirrel cage that may be utilized in the practice of the present invention in one preferred form thereof.

FIG. 9 illustrates a rotor circuit having a single end ring conductor 122 at one end thereof and three end ring conductors 123–125 at the other end thereof. This circuit satisfies the preference that "$n$" is an odd number, as well as the other preferences mentioned in the immediately preceding paragraph.

In the rotor circuit of FIG. 9, three separate cage sets are provided, and thus "$n$" equals three. FIG. 9, like FIGS. 5–8 depicts a rotor bar pattern for two fundamental poles, and the pattern of FIG. 9 thus spans 360 fundamental electrical degrees. In FIG. 9, one cage set is comprised of the bars 126, a second cage set comprises bars 127, and the third cage set, the bars 128. It will be specifically noted that adjacent bars (i.e., rotor slots) are spaced apart 40 fundamental electrical degrees, but that the adjacent bars of any given cage set (for example adjacent ones of bars 126) are spaced apart 120 fundamental electrical degrees.

It is noted that motors embodying the invention could be constructed with rotors that are fabricated by casting separate end rings, or by casting large solid end rings and then machining the end rings so as to separate them. It also should be recognized that teachings presented herein may be applied to motors with any integral number of pairs of poles; moreover, when motors are constructed as taught herein, rotor spiral may be selected by considerations other than decoupling of the third space harmonic, such as reluctance locking and noise produced by magnetic forces.

While the preceding portion of this specification has tended to emphasize applications where multi-speed operation is intended, and therefore wherein low-speed stability must be considered; my teachings may be used to great benefit where single speed motor operation is desired. In situations where low-speed stability is not of concern, motors embodying the invention may be optimized to have even greater efficiencies than would be indicated by the motor for which the data for FIG. 4 was collected.

For example, motors have not been constructed that are characterized by an absence of third harmonic torque, starting torque comparable to prior art motors, greater maximum torque, greater peak of efficiency, and greater output for the same losses at a reference speed point. Research that has now been conducted indicates that while motors embodying the present invention will tend to have substantially improved performance, care should continue to be exercised to insure that the resistance between the rotor conductor bars and magnetic rotor core is relatively high. Moreover, the total number of rotor bars preferably are not an integral number per pole (for example a number 3 ½ or 4 ½ rotor slots per fundamental frequency stator pole is preferred to three slots or four slots per fundamental frequency stator pole).

It has also now been determined that, in shaded pole applications, optimization of the stator bore (in terms of providing chamfers, steps, or internal reluctance slots) may result in further optimization of performance characteristics, although it is again emphasized that the same stator punching geometry and stack height was used to obtain the data for each of FIGS. 1–4; although the number of winding turns, voltage, and wire size were independently selected for each of those motors to yield the desired high and low speed operating points under nominal voltage conditions.

Turning now to FIG. 10, one preferred mode of carrying out the present invention will be described. At the outset, it should be noted that the structure actually shown in FIGS. 10 et seq. (and later described herein) should be taken as exemplary of a presently contemplated preferred mode of carrying out the invention, but such description and illustration should not be construed to be limiting. For example, a six pole shaded pole stator will be shown and described, but it will be understood that the invention would also be of utility in motors having a different number of poles and in induction motors wherein the stator is of a type other than shaded pole. For example, the invention could also be of primary utility in permanent capacitor motor applications—and in induction motors having distributed winding arrangements having high third space harmonic content. This would be the case, for example, in motors having only one winding coil per pole but where there are six winding slots per pole; or in induction motors having 12 winding slots per pole but wherein only one, two, or three coils per pole are used. In these and other types of distributed winding stators, the third, fifth, etc., space harmonic content may tend to be appreciable and, accordingly, decoupling (or prevention of coupling) of the third space harmonic with the rotor circuit could be of particular value.

In FIG. 10 I have shown a fractional horsepower induction motor 130 that comprises a stator assembly 131 and rotor assembly 132. The stator assembly includes a magnetic core 133 which is comprised of a plurality of low carbon, common iron laminations. Each of the laminations 134, and thus the core 133, are provided with a number of salient poles about which a concentrated winding coil 136 is disposed. It will be noted that the trailing pole tip of each of the poles includes a slot 137 in which a closed loop shading coil 138 is carried. In the motor illustrated, winding retaining pins 139 are provided to facilitate the manufacture of the motor, these pins providing a restraint for the coils, and being located so as to prevent inadvertent movement of portions of the coils toward the bore 141 of the stator core. The winding coils 136 are made up of a plurality of turns of wire, these turns being arranged so that the current flowing therethrough (during operation) will instantaneously establish alternate north and south poles. The motor 130 may be wound in any desired fashion. However, for purposes of description, the multi-speed motor 130 was wound as described below.

The motor 130 is provided with three lead wires 142, 143, and 144, which may be selectively connected to a source of energization voltage so as to cause operation of the motor. In the fabrication of the motor 130, during the winding process, a strand of wire was wound to form a number of turns about each of the poles of the core so as to establish six concentric salient coils, each coil comprising a desired predetermined number of turns disposed about a pole piece 146 of the motor. This same procedure was then repeated with a second continuous strand of wire so that the resultant winding disposed about each of the salient polar projections of the core actually comprised two separate coils. The coils of each set were serially connected. The ending wire segment from one of these sets of coils was connected to the beginning wire segment of the other set of the coils. Lead wire 144 was connected to the beginning end of the first coil set, lead wire 143 was connected to the juncture of the first set ending wire segment and the second set beginning wire segment; and lead wire 142 was connected to the ending segment of the second coil set. High speed operation of motor 130 resulted when lead wires 143 and 144 were connected to a source of energization voltage. On the other hand, low speed operation occurred when lead wires 144 and 142 were connected to the same voltage source because all of the winding turns (i.e., both sets of coils) were interconnected in series relationship across the voltage source.

A rolled and welded steel sheel 147 has been shown in FIG. 10. It will be noted that ventilation openings 148 have been provided in the shell to enhance cooling of the motor and that the core 133 has been pressed into the shell. Each of the end frames 151, 152 carry a bearing 153 which is supplied with lubricant from a lubricant retaining material such as the felt member 154, or any other type of suitable lubricant storage material. The motor 130 is designed to have only one shaft end protrude therefrom, so a solid end cap 155 is provided on the opposite pulley end to close the open end of the lubricant reservoir 156. The oil well cover used on the pulley end of the motor however was provided with a centrally disposed opening through which the pulley end of the shaft extended. It will be understood that the pulley end of the shaft may be provided with a flat by means of which a fan or blower may be positively driven. Alternatively, such blower or fan could be pressed onto the shaft end.

A plurality of clamp bolts 157, disposed in four clamp bolt holes 158 (one hidden from view by cap 155) pass internally of the shell. A nut 159 is fastened to the end of each clamp bolt and thus secures the parts shown in FIG. 10. The motor 130 may be supported in any suitable fashion. For example, a band type mount that extends circumferentially about the shell 147 may be used. Alternatively, a base mount may be provided which supports the motor 130 by means of resilient cushion mounts carried on the hubs 161 of the end frames. Of course, mounting lugs or tabs may be welded at desired locations about the periphery of the shell 147.

With reference to the rotor assembly 132, it first is noted that the rotor is comprised of a magnetic core made up of a plurality of low carbon, common steel laminations that are skewed slightly one rotor slot pitch (13 ⅛ mechanical degrees as shown) in a manner as will be understood by persons having ordinary skill in the art. The amount of skew would be optimized, of course, for specific application specifications.

In the manufacture of the rotor body 163, the laminations are stacked together, and aluminum conductor bars and end rings are then diecast in place on the core. Thereafter, as is usual practice, the outer diameter of the rotor is machined and the rotor body then is stress-relief annealed. In the manufacture of the motor 130, the laminations making up the rotor core were annealed individually prior to assembly as a core. As the diecast rotor exited from the stress-relief anneal oven, it was positioned over a shaft 162 (which was at room temperature) and dropped into a desired position thereon (the shaft 162 having previously been assembled with the thrust collar 163). Just after the cast rotor (still in a heated condition) was positioned as desired on shaft 162, the rotor and shaft were quenched in water so as to shrink the rotor into a permanent shrink fit assembly with the shaft 162. This process has been followed heretofore and was continued in the manufacture of the motor 130.

It has been determined that if the rotor has not been annealed properly, less than satisfactory operating efficiency may result. This condition may readily be remedied by heating the outer diameter of the rotor with a torch and thereafter quenching it in water. Alternatively, the rotor assembly may be reprocessed through a steam blue anneal operation. It is believed that inadequate heat treatment of the rotor body. after the aluminum conductive members have been cast in place thereon, results in low aluminum to iron resistance, and that the iron rotor core then provides an electrical circuit which, to at least some extent, couples the rotor with the third space harmonic.

However, if known processing steps are followed as above indicated, the conductor to core resistance in the rotor appears to be sufficiently great to prevent coupling of the rotor with the third space harmonic (assuming of course that the above mentioned criteria concerning the desired number of rotor cage sets, spacing thereof, etc., is followed). It will be noted that the rotor of FIG. 10 includes a single end ring 122 at one end thereof and three spaced apart end rings 123, 124, and 125 at the other end thereof. Constructional details of the assembly 132 and portions thereof are better shown in FIGS. 11–14, inclusive.

With reference now to FIG. 11, the exposed portions of the conductive bars of the rotor have been identified in FIG. 11 with the reference numerals 127, 128, and 126. Although each of the rotor bars are separated one from another within the body of the rotor, they are all interconnected at the left end of the rotor (as viewed in FIG. 11) by the single end ring 122. On the other hand, only the rotor bars designated by the reference numeral 126 are interconnected with the end ring 125; only rotor bars 127 are interconnected with the end ring 124; and only the rotor bars 128 are interconnected with the innermost end ring 123.

FIG. 12 best illustrates the configuration of the laminations 166 utilized to manufacture the body of the rotor shown in FIG. 11. It is noted that the lamination shown in FIG. 12 (as well as the lamination 167 shown in FIG. 13) has been drawn to substantially full size. Moreover, FIGS. 12 and 13 illustrate the configuration of the rotor laminations prior to the outer diameter machining operation. Thus, the outer peripheral portions of the conductor slots in the rotor laminations are bounded by steel in FIGS. 12 and 13, but after machining the outer peripheral surface of the laminations is removed and a portion of the conductor bars may be observed as revealed in FIG. 11.

Portions of six conductor bars have been illustrated in cross-section in FIGS. 12 and 13 to provide a better understanding of the relationship of the interior laminations 166 and the end lamination 167.

FIG. 14 is a somewhat diagrammatic representation of a view that would be seen looking at the structure of FIG. 11 in the direction of the arrows 14—14. FIG. 14 clearly reveals that only every third rotor bar is in the same cage set. Since this rotor is designed for use in the stator shown in FIG. 10, it will be appreciated that there are 4 ½ rotor bars per fundamental pole. This is because there are a total of 27 rotor bars, and six fundamental poles associated with the stationary assembly. The provision of a whole number plus ½ bars per pole is preferred.

It further will be noted that the mechanical angular spacing between adjacent slots in the rotor lamination 166 are 13 ⅓ mechanical degrees. Moreover, since there are six fundamental poles, (each spanning 180 electrical degrees) the mechanical degree equivalent for each fundamental pole would be 60 mechanical degrees. It then should be noted that, since only every third bar is in the same cage set, the adjacent bars in each cage set are spaced apart 40 mechanical degrees, or two-thirds of a fundamental pole pitch.

It will be recalled that it was stated hereinabove that the number of end rings at one end of the rotor, times the number of end rings at the other end of the rotor, must be equal to or greater than (i.e., not less than) the number of cage sets. In the case of the rotor shown in FIG. 11, the product of the number of end rings at the two ends of the rotor is three, and thus equal to the number of rotor cage sets.

The preferences mentioned above may be set down in mathematical terms as follows. The minimum total number "M" of bars (or conductors) in the rotor should equal: $1 ½ \times N \times n$; where "n" is the number of cage sets as defined hereinabove, and where "N" is the number of fundamental poles. Using this formula, if the stator shown in FIG. 10 were designed to have only four fundamental poles, the rotor lamination shown in FIGS. 12 and 13 would have a minimum of 18 equally spaced apart slots when three cage sets were used with every third bar being in the same set.

Figure 17:
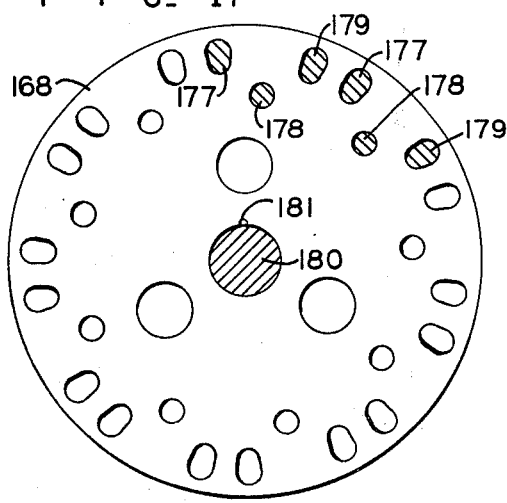
FIG. 17 is a view looking in the direction of the arrows 17—17 in FIG. 15, with parts removed and parts broken away.
Figure 18:
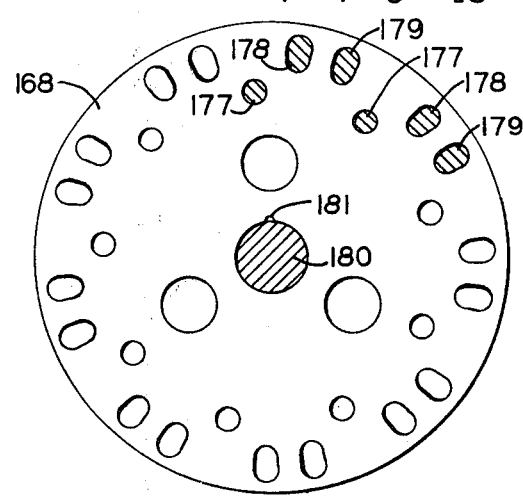
FIG. 18 is a view looking in the direction of the arrows 18—18 in FIG. 15 with parts removed and parts broken away.
Figure 19:
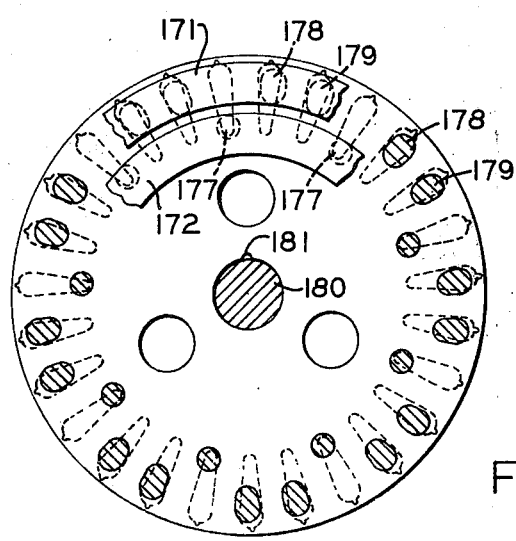
FIG. 19 is a view taken substantially in the same direction as the view of FIG. 18, but with less parts removed as compared with FIG. 18.

Turning now to FIG. 15, another rotor construction that is usable in lieu of the rotor shown in FIG. 11 will be described. The circuit for the rotor of FIG. 15 is shown in FIG. 16, and corresponding reference numerals are used in FIGS. 15 and 16. The rotor 165 has the central portion thereof made up of the same laminations 166 that are shown in FIG. 12. However, a different end lamination 168 has been utilized. The specially configured end lamination 168 has been used at each end face of the rotor, and at opposite ends thereof two end rings 171, 172, and two end rings 173, 174, are provided. The end laminations 168 are identical to one another but appear flipped-flopped relative to one another when viewed in the same direction. Thus, the end lamination at the right hand end of the rotor in FIG. 15 appears as shown in FIG. 18 when viewed in the direction of the arrows 18—18. Similarly, the end lamination 168 (at the left side of the rotor) as viewed in FIG. 15 appears as shown in FIG. 17 when viewed in the direction of the arrows 17—17. However, if the end lamination at the left end of the rotor 15 were viewed in a direction opposite to the direction of the arrows 17—17, the lamination then would appear exactly as illustrated in FIG. 18.

Turning for the moment to FIG. 16, a schematic representation of two fundamental poles of the circuit for the rotor 167 will be described. It will be noted that three cage sets have been provided and thus "n" is equal to an odd number. A first cage set is made up of the bars 177; a second cage set is made up of the bars 178; and a third cage set is made up of the bars 179.

Referring now once again to FIGS. 15, and 17–19, it will be noted from a review of FIG. 19 that the rotor bar 177 which is disposed almost vertically above the skew aligning notch 181 is interconnected to the end rings 172 and 173. Proceeding in a clockwise direction from conductor bar to conductor bar in FIG. 19, the next conductor bar 178 is connected at one end to outer end ring 171 and at the opposite end to inner end ring 174. The next conductor bar 179 is connected to the outer end ring 171 as well as to the outer end ring 173. Ths connection pattern then is repeated for all succeeding bars 177, 178, 179.

To review the foregoing, it is again noted that the number of bars per cage set is one and one-half times the number of fundamental stator poles. Moreover, the number of "sets" ($n$) is an odd integer greater than unity, and the span between two adjacent bars of the same cage "set" is twice the pitch of the third space harmonic. To further emphasize that the rotors shown in FIGS. 11 and 15 are exemplary only, it is pointed out for example, that for a six pole fundamental application; five cage sets may be utilized (by using three end rings at one end of the rotor and two or three at the other end) and by providing 7 ½ rotor bars per fundamental pole so that a total of 45 evenly spaced rotor slots (and therefore conductive bars) would be provided.

It should be particularly emphasized that the selection of "n" as an odd integer is to provide a means for solving the reluctance locking torque problem. Therefore, when other means are utilized to solve the reluctance locking torque problem, or for designs or applications where this problem is not significant, the even numbers for "n" may simplify some rotor constructions.

By way of further emphasis of the exemplary nature of the foregoing, it is now pointed out that, for a four pole fundamental ($N = 4$), and when "n" is preselected to equal six, thirty-six slots may be provided in the rotor body. Alternate ones of the slots then would carry bars that were arranged in "sets" as previously described, and interconnected with two separate end rings at each rotor end (or one ring at one end and three at the other) as taught hereinabove. The same connection pattern with a second set of end rings (independent from the first set of end rings) would be established for the bars carried by the other rotor slots. In this manner, six cage "sets" could be provided with three of the cage sets interrelated and interconnected by their connection to the first end ring set and the other three cage sets interrelated and interconnected by the second end ring set. The resulting structure thus would provide two cages having the conductors therein in parallel magnetically, but with no electrical connection between cages.

In addition, the foregoing discussion has emphasized the importance of decoupling the third space harmonic, but it should be understood that the fifth, seventh, etc., space harmonic also can be decoupled. This may be accomplihsed by arranging the conductors in a cage set so that adjacent conductors in a given set are spaced apart twice the pitch of the space harmonic to be decoupled.

Thus, to decouple the fifth space harmonic, the span between two adjacent bars in a given cage set would be two-fifths (2/5) of a fundamental pole span (or 72 fundamental electrical degrees with a fundamental pole span of 180 fundamental electrical degrees).

While "end rings" have been referred to extensively herein, it should be recognized that the particular geometry of the end conductors may be varied. Moreover, while conductor "bars" have been referred to, it will be obvious that multiple conductors may be disposed in the rotor slots, and it is not necessary that these conductors be made by casting. For instance, rotors enbodying the invention could be fabricated with axially spaced apart (rather than radially) end rings. Then special end laminations would not be needed, although the innermost rings would be provided with clearance holes through which selected rotor conductors could pass.

Figure 8:
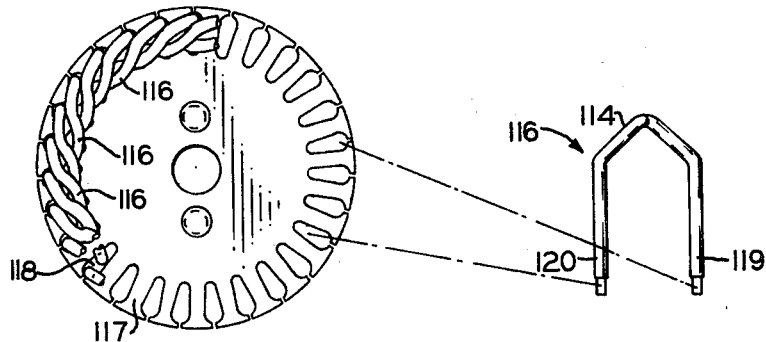
FIG. 8 is a representation of one construction embodying some features of the invention.

With reference to FIG. 8, a "hairpin" rotor conductor approach also may be used. In this case, the conductors would be fabricated as "U" shaped members 116 with the two legs 119, 120 of each member extending axially along the rotor core 117. The bight portion 114 of the member would then be positioned at one end of the rotor core, and the ends of all of the legs of all of the members would be connected together at the other end of the rotor core, e.g., by a common end ring. With this type of construction, each member will span 120 fundamental electrical degrees (in order to decouple the third space harmonic). The construction shown in FIG. 8 is, as will be understood by those skilled in the art, a rotor for use in a stator having a six pole fundamental field. The span of each member 116 corresponds to the "span" of a cage set as set out hereinabove. Moreover, two conductor legs will be positioned in each of the twenty-seven slots 118, and twenty-seven members 116 are utilized. Thus nine members 116 constitute a cage "set" as used herein, each set being made up of nine conductors, each one of which have a leg disposed in a slot 118 with the leg of another conductor in the same set. Since the rotor of FIG. 8 which includes twenty-seven members 116, will be used with a six pole fundamental frequency pole structure, nine members 116 (one-third of the total of twenty-seven will constitute the rotor conductors for a pair (one-third of the total of six fundamental poles) of fundamental poles. It is preferred that the conductors 116 be insulated from the core 117 and from one another (since they cross one another). For example, a magnet wire insulating coating may be provided on the conductors, or a natural aluminum oxide on aluminum conductors would suffice.

In all of the embodiments described herein, it is preferred that the impedance in each cage set (or "hairpin 116") be balanced in order to minimize locking at three times the fundamental pole structure.

In view of all of the foregoing, the magnitude of the advantages accruing from utilization of the invention as taught herein should readily be appreciated.

Thus, while I have shown and described what at present are considered to be preferred embodiments of the invention in accordance with the Patent Statutes, changes may be made without departing from the true spirit and scope of the invention. I therefore intend to cover in the following claims all such equivalent variations as fall within the invention.

What I claim as new and desire to secure by Letters Patent of the United States is:

1. A rotor for use in an induction motor having a magnetic core with winding turns disposed thereon to produce a fundamental magnetic field of a number N of instantaneous fundamental magnetic poles during excitation of the winding turns, the rotor comprising a magnetic core having a plurality of angularly spaced apart conductor accommodating slots extending between first and second ends thereof, a minimum total number M of longitudinally extending conductor disposed in M different uniformly angularly spaced apart ones of said slots and extending between said first and second ends, a number A of end conductors disposed at the first end of the core, and a number B of end conductors disposed at the second end of the core; with said longitudinally extending conductors arranged in a pattern to form a number n of different cage sets of longitudinally extending conductors selectively connected to at least one end conductor at each end of the rotor core so that the longitudinally extending conductors of each set are connected in short circuit relation with each other through end conductors, with next adjacent longitudinally extending conductors within each set spaced apart two-thirds of a fundamental pole pitch and the number n selected to be an odd integer greater than unity; and wherein the number M is at least equal to the quantity 4.5 × N, and the product A × B is at least equal to the number $n$.

2. The invention of claim 1 wherein the M conductors act as a single short circuited cage with regard to the fundamental field produced during excitation of the winding turns, said single short circuited cage having a number of conductors per fundamental pole equal to M divided by N.

3. The invention of claim 1 wherein the rotor conductor accommodating slots are spiraled axially along the rotor core.

4. The rotor of claim 1 wherein pairs of conductors in each cage set comprise the legs of a U-shaped conductor, wherein there are a number B of U-shaped conductors, and wherein the bight portion of each U-shaped conductor form the number B of conductors disposed at the second end of the core.

5. An induction motor comprising a stator core having winding turns supported and positioned thereon to establish a fundamental magnetic field of a number of instantaneous fundamental magnetic poles during energization, and a rotor comprising a magnetic core and a plurality of longitudinally extending conductors that inductively couple with the fundamental pole structure of the fundamental magnetic field and that are arranged along the magnetic core in a predetermined pattern so as to form a number $n$ of different cage sets with the longitudinally extending conductors in each set short circuited one to the other in each such set at the ends thereof by end conductors; next adjacent longitudinally extending conductors within each cage set being spaced apart a distance substantially equal to twice the pitch, in fundamental electrical degrees, of an odd space harmonic of the fundamental magnetic field so that inductive coupling of the same odd space harmonic of the fundamental magnetic field and a rotor circuit established by the longitudinally extending conductors and end conductors is substantially prevented.

6. An induction motor comprising a stator core having winding turns supported and positioned thereon to establish a magnetic field of at least six instantaneous fundamental magnetic poles during energization, and a rotor comprising a magnetic core and a plurality of conductors that inductively couple with the fundamental pole structure of the fundamental magnetic field and that are arranged along the magnetic core in a predetermined pattern so as to form a plurality of cage sets with the conductors in each set short circuited one to the other in each such set at the ends thereof by conductor means; next adjacent conductors within each such cage set being spaced apart a distance substantially equal to twice the pitch, in fundamental electrical degrees, of an odd space harmonic of the fundamental magnetic field; said motor including winding connections that are provided so that only a portion of the winding turns may be selectively energized to provide an operating point other than the operating point that is provided when all of the winding turns are energized; and wherein the motor is of the shaded pole type.

7. An induction motor comprising a stator core having winding turns supported and positioned thereon to establish a magnetic field of at least six instantaneous fundamental magnetic poles during energization, and a rotor comprising a magnetic core and a plurality of conductors that inductively couple with the fundamental pole structure of the fundamental magnetic field and that are arranged along the magnetic core in a predetermined pattern so as to form a plurality of cage sets with the conductors in each set short circuited one to the other in each such set at the ends thereof by conductor means; next adjacent conductors within each such cage set being spaced apart a distance substantially equal to twice the pitch, in fundamental electrical degrees, of an odd space harmonic of the fundamental magnetic field; said motor including winding connections that are provided so that only a portion of the winding turns may be selectively energized to provide an operating point other than the operating point that is provided when all of the winding turns are energized; and wherein the motor is of the permanent capacitor type.

8. An induction motor comprising a stator assembly having a magnetic core and winding turns that establish a number $N$ of instantaneous fundmental magnetic poles during excitation of the winding turns, and a rotor comprising a magnetic core having a plurality of angularly spaced apart conductor accommodating slots extending between first and second ends thereof, a minimum total number $M$ of conductos disposed in $M$ different uniformly agnularly spaced apart ones of said slots and extending between said first and second ends, a number $A$ of conductors disposed at the first end of the core, and a number $B$ of conductos disposed at the second end of the core; with said conductors arranged in a pattern to form a number $n$ of different cage sets of conductors selectively connected to a conductor at each end of the rotor core so that the conductors of each set are connected in short circuit relation with the other conductors of the same set through a conductor at each end of the rotor, with next adjacent conductors within each set spaced apart two-thirds of a fundamental pole pitch and the number $n$ selected to be an odd integer at least equal to the number three; and wherein the number $M$ is at least equal to the quantity $4.5 \times N$, and the product $A \times B$ is at least equal to the number $n$.

9. The motor of claim 8 wherein the next adjacent bars of each set are separated by $n\text{-}1$ bars of the other sets.

10. The motor of claim 8 wherein $N$ is at least equal to six, and $M$ is at least equal to twenty-seven.

11. The motor of claim 10 wherein $N$ does not exceed eight.

12. The motor of claim 8 wherein $N$ is at least equal to two but not greater than four, and $M$ is at least equal to nine.

13. The induction motor of claim 8 wherein the stator assembly is adapted to establish a magnetic field of six fundamental magnetic poles during operation; and wherein the rotor includes twenty-seven conductors extending between said first and second ends and at least three end conductors.

14. A rotor adapted for use in a motor having a stator that establishes a magnetic field of a predetermined number of fundamental magnetic poles during operation, the rotor comprising a number of first conductors, per fundamental pole, that is equal to an integer plus one-half; said rotor further comprising a plurality of second conductors; said first conductors being arranged in cage sets and interconnected at the ends thereof to selected ones of the plurality of second conductors so that next adjacent ones of the first conductors within each cage set are spaced apart a distance substantially equal to twice the pitch, in fundamental electrical degrees, of a preselected odd space harmonic of the magnetic field, so that coupling of the preselected odd space harmonic of the magnetic field with a rotor circuit established by the first and second conductors is substantially prevented.

* * * * *

UNITED STATES PATENT AND TRADEMARK OFFICE
CERTIFICATE OF CORRECTION

PATENT NO. : 3,987,324
DATED : October 19, 1976
INVENTOR(S) : Clovis E. Linkous

It is certified that error appears in the above—identified patent and that said Letters Patent are hereby corrected as shown below:

Col. 3, line 13, delete "prpesent" and insert --present--;
       line 36, delete "nott" and insert --not--
       line 44, after "cage" insert --types--.
Col. 6, line 1, delete "hve" and insert --have--.
Col. 8, line 43, delete "ths" and insert --this--.
Col. 10, line 13, delete "not" and insert --now--.
Col. 15, line 68, after "seven" insert --)-- (parenthesis).
Col. 18, line 10, delete "conductos" and insert --conductors--;
        line 11, delete "agnularly" and insert --angularly--;
        line 14, delete "conductos" and insert --conductors--.

Signed and Sealed this

Seventh Day of June 1977

[SEAL]

Attest:

RUTH C. MASON
Attesting Officer

C. MARSHALL DANN
Commissioner of Patents and Trademarks